United States Patent [19]
Schmid

[11] Patent Number: 6,067,786
[45] Date of Patent: May 30, 2000

[54] OPENING DEVICE FOR AN OPEN-END SPINNING AGGREGATE AND METHOD OF MAKING SAME

[75] Inventor: Friedbert Schmid, Bad Ueberkingen, Germany

[73] Assignee: Wilhelm Stahlecker, GmbH, Deggingen-Reichenbach im Taele, Germany

[21] Appl. No.: 09/251,728

[22] Filed: Feb. 18, 1999

[30] Foreign Application Priority Data

Mar. 6, 1998 [DE] Germany ............... 198 09 636

[51] Int. Cl.$^7$ ........................... D01H 4/00
[52] U.S. Cl. ............... 57/406; 57/404; 57/408; 57/412
[58] Field of Search ............... 57/404, 406, 408, 57/301, 412

[56] References Cited

U.S. PATENT DOCUMENTS

| | | | |
|---|---|---|---|
| 4,024,699 | 5/1977 | Goldhammer et al. | 57/58.91 |
| 4,096,686 | 6/1978 | Stahlecker et al. | 57/58.95 |
| 4,098,065 | 7/1978 | Stahlecker et al. | 57/58.95 |
| 4,246,745 | 1/1981 | Rehm et al. | 57/400 |
| 4,461,141 | 7/1984 | Hofmann et al. | 57/408 |

*Primary Examiner*—William Stryjewski
*Attorney, Agent, or Firm*—Evenson, McKeown, Edwards & Lenahan, P.L.L.C.

[57] ABSTRACT

An opening device for an open-end spinning aggregate has a housing which takes up an opening roller. The housing includes a base plate arranged perpendicular to the axis of the opening roller. The base plate is covered by a flat metal sheet, which is provided with an anti-adhesive coating. The anti-adhesive coating is preferably a ceramic layer shot through with PTFE.

22 Claims, 3 Drawing Sheets

OPENING DEVICE FOR AN OPEN-END SPINNING AGGREGATE AND METHOD OF MAKING SAME

BACKGROUND AND SUMMARY OF THE INVENTION

This application claims the priority of German application 198 09 636.4, filed Mar. 6, 1998 in Germany, the disclosure of which is (are) expressly incorporated by reference herein.

The present invention relates to an opening device for an open-end spinning aggregate comprising a housing which takes up an opening roller, which housing comprises a base plate arranged perpendicular to the axis of the opening roller, which base plate is provided with a sheet metal insert having an anti-adhesive coating.

In spite of the cotton being cleaned when the sliver is made, the fibers to be spun in the open-end spinning aggregate can still contain impurities in the form of "honeydew". Honeydew is composed of sticky insect deposits, as well as plant nectar secretions, which fall on the cotton. Honeydew makes the fibers stick together and makes opening in the opening device difficult. The sticky deposits are deposited on those parts of the opening device where either the fiber material slides along guiding surfaces or where impurities from the opening device are ejected in a trash removal opening.

In order to avoid honeydew deposits, it is disclosed in U.S. Pat. No. 5,398,494 that the peripheral surfaces of the opening roller which come into contact with the fibers as well as the defining walls of a trash removal opening are directly provided with an anti-adhesive coating. This coating can be provided on a base plate which is arranged perpendicular to an axis of the opening roller in the area of the trash removal opening. In this publication it is additionally disclosed that the trash removal opening can be in the form of a shaft-like insert part made of sheet metal, which comprises the anti-adhesive coating.

Anti-adhesive coatings applied directly to the base plate are not possible if the coating has to be hardened by means of heat treatment, and the housing is not sufficiently heat resistant, for example, when it is made from a zinc casting.

It is an object of the present invention, in the case of antiadhesive coatings of housings of opening devices, not to have to take the material of the housing into consideration and, in relation to the surfaces of the base plate to be coated, not to be restricted to the area of a trash removal opening.

This object has been achieved in accordance with the present invention in that the metal insert is a flat sheet of metal which covers the base plate.

With the application of the present invention it is possible, while retaining the current design, to provide the base plate of the housing of the opening device with an anti-adhesive coating. Only a very slight change in the tolerance of the housing need be undertaken for the metal sheet which measures only a few tenths of a millimeter. The metal sheet can be made from a material which fulfills the specifications of the anti-adhesive coating. Thus the material of the base plate is, for the purpose of the present invention, irrelevant. In addition, it is now possible to render the entire base plate and not only the area of a trash removal opening insensitive to honeydew deposits.

In an embodiment of the present invention, the sheet metal can be clamped to the base plate by means of the peripheral walls surrounding the opening roller. It is then not necessary to adhere the metal sheet to the base plate or otherwise affix it thereto. As the peripheral walls have, in any case, to be affixed to the base body, the metal sheet can be a thin washer between the base plate and the peripheral walls.

When the anti-adhesive coating is applied to the metal sheet in conjunction with heat treatment, the thin metal sheet becomes somewhat convex on the coating side, that is, the metal sheet curves slightly. This can be used to advantage in that the metal sheet in an unclamped state is slightly curved in such a way that it is disposed only with its edge areas on the base plate. After the metal sheet has been clamped to the base plate by the peripheral walls, the metal sheet is disposed flat on the base plate.

The metal sheet is provided for the purpose of the present invention from the start with recesses for the opening roller and for a feed roller arranged upstream of the opening roller. The opening roller and the feed roller penetrate the metal sheet, which thus covers all surfaces on the base plate of the opening device, whereby the anti-adhesive coating of the metal sheet effectively prevents the depositing of honeydew.

As mentioned above, the metal sheet can be made more heat resistant than the base plate. For example, the base plate can be made of zinc casting, whereby the metal sheet can be made of coated aluminum or steel.

A ceramic layer has proved to be suitable as an anti-adhesive coating for the metal sheet, which ceramic layer is shot through with polytetrafluor ethylene (PTFE). The ceramic layer is applied to the metal sheet on one side by means of a hot plasma jet, during which the metal sheet is deformed to a slight convex shape. The ceramic layer is subsequently sprayed with PTFE, whereby this plastic penetrates to the base plate and into the ceramic pores of the metal sheet. Hardening then takes place by means of heat treatment at approximately 350° C. The coating, a mixture of ceramic and PTFE, provides not only a very good wear resistance due to its scratch-resistance, but has such a low friction coefficient that it is suitable as an anti-adhesive coating against trash und in particular against honeydew.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
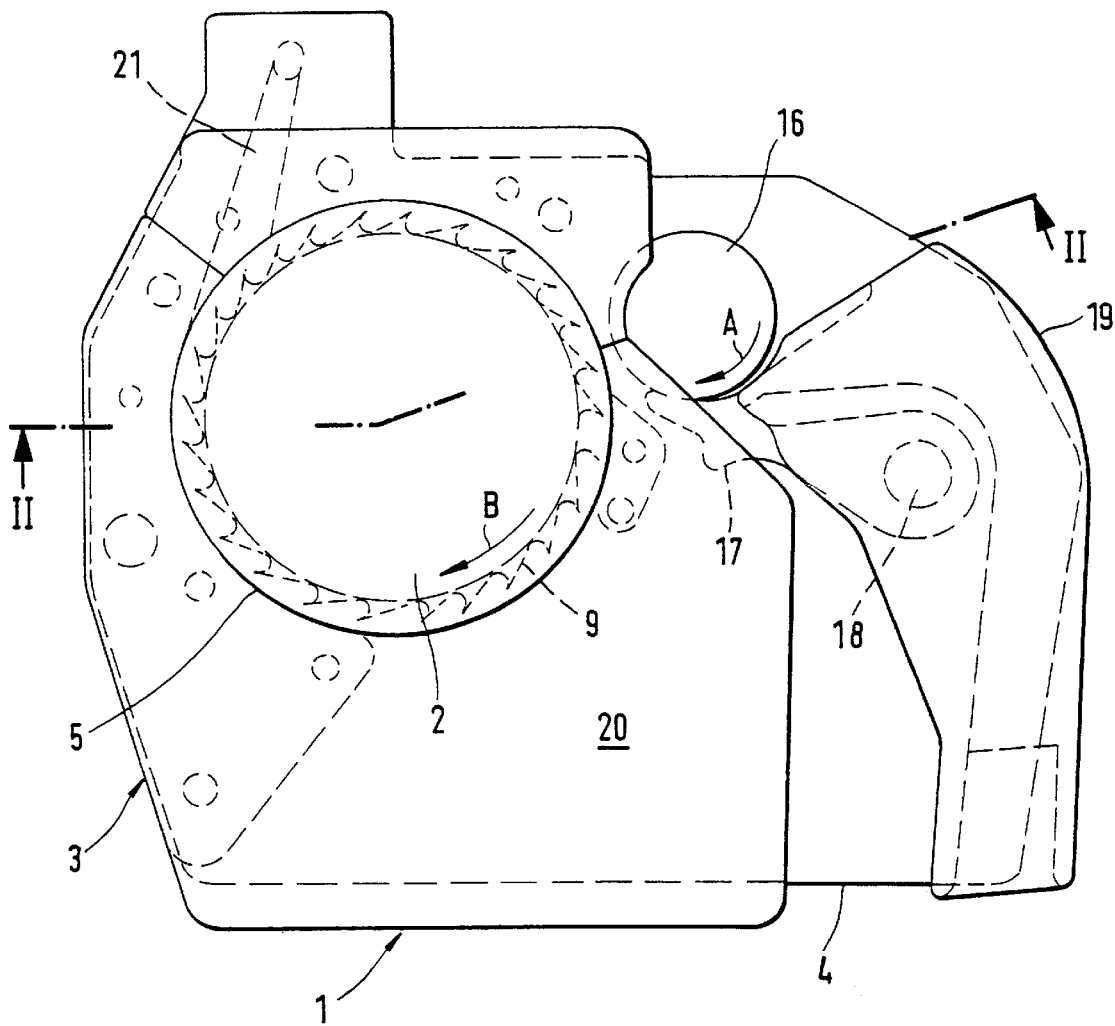
FIG. 1 is a sectional schematic side view of an opening device constructed according to a preferred embodiment of the present invention.
Figure 2:
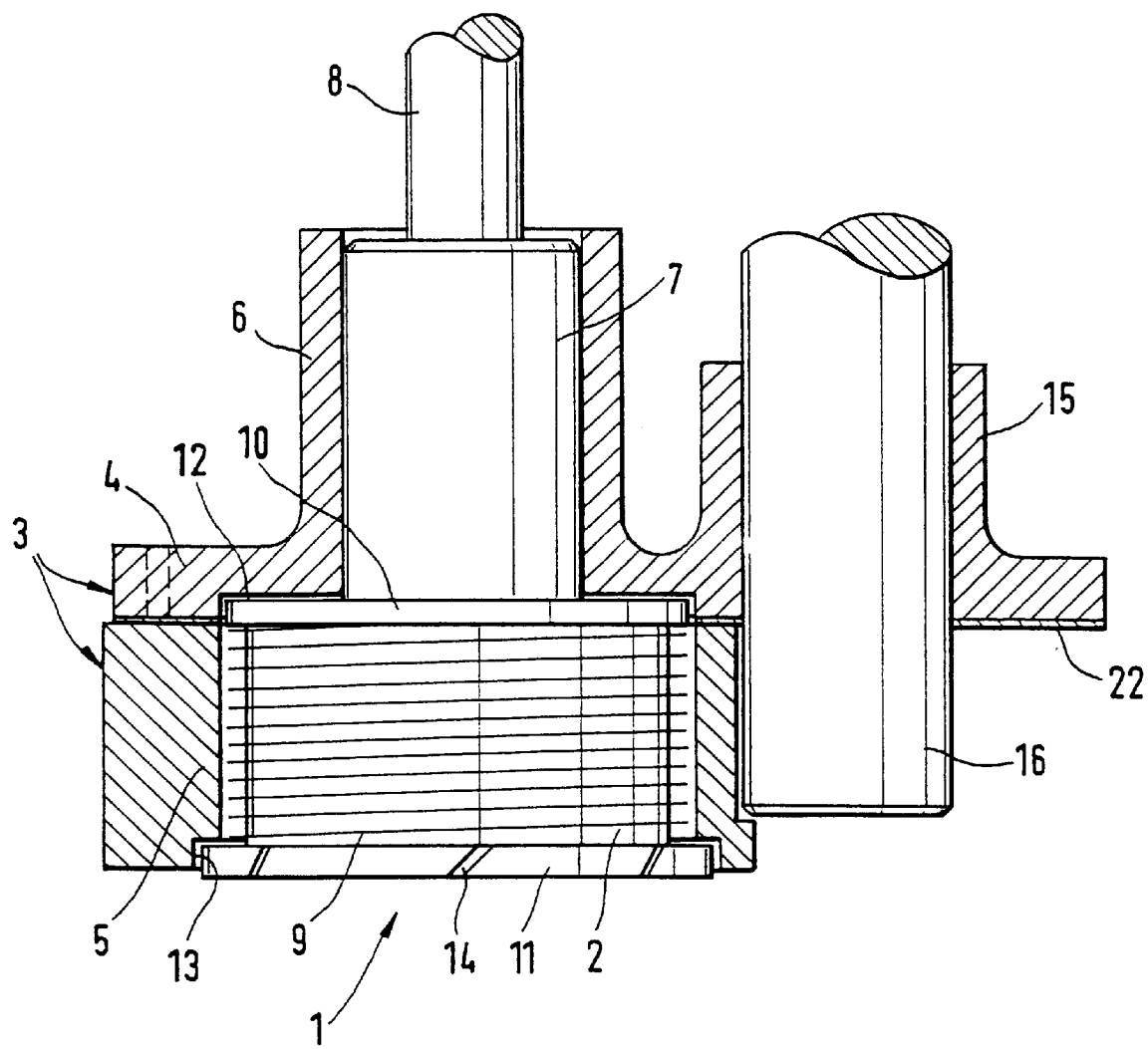
FIG. 2 is a sectional view through the opening device along the intersection line II—II of FIG. 1.

The opening device 1 according to FIGS. 1 and 2 is a component part of an open-end spinning aggregate (not shown in any further detail), in which a fed sliver is opened to single fibers, which are then spun into a yarn. This open-end spinning process is known to those in the field.

The opening device 1 comprises an opening roller 2, which is taken up by a housing 3. The housing 3 comprises a base plate 4, as well as the peripheral walls 5 surrounding the opening roller 2. These peripheral walls 5 comprise an opening for feeding the sliver (not shown), a trash removal opening arranged to a trash removal area 20, as well as an opening for a fiber feed channel 21, through which the fibers opened in the opening device 1 are fed to a spinning rotor (not shown).

The base plate 4 is plate-formed only on its side facing the opening roller 2 and comprises on its back side tube-like extensions 6 and 15. The tube like extension 6 serves to take up a bearing housing 7 of the opening roller 2, the extension 15 serves to take up a feed roller 16 arranged upstream of the opening roller 2. It can be provided that the entire housing 3 can be swivelled around an swivel axle formed by the feed roller 16.

In the bearing housing 7, an axle 8 of the opening roller 2 is supported in a way not shown in more detail. This axle 8 extends perpendicularly to the base plate 4.

In a known way, the opening roller 2 is provided with combing structure 9, which can comprise saw-wire teeth or needles or the like. The opening roller 2 is bordered in axial direction on both ends by means of a collar 10 and 11. These collars 10 and 11 serve on the one hand as protection for the combing structure 9 after a disassembly of the opening roller 2 as well as on the other hand sealing off the opening roller 2 entirely against the outer atmosphere. During operation, a vacuum prevails at the combing structure 9 of the opening roller 2.

The base plate 4 has a recess 12 which is adapted to the collar 10, which recess 12 serves here as a labyrinth seal of the opening roller 2 against the housing 3. On the peripheral walls, a recess 13 is provided which is adapted in a similar way to the collar 11, so that towards the operator's side a labyrinth seal also arises. The collar 11 is in addition provided with fly-deflecting notches 14, which serve to propel back fiber material which moves from the combing structure 9 to the collar 11.

The feed roller 16 and the opening roller 2 arranged downstream thereof run in the same direction according to the rotational directions A and B, whereby the speed of the opening roller 2 is many times higher than the speed of the feed roller 16.

A feed table 17 is arranged to the feed roller 16, which feed table 17 can be swivelled around a swivel axle 18 and thus in a way not shown, presses the fed sliver to the feed roller 16. A load spring (not shown) is provided to effect this pressing. The swivel axle 18 is also arranged in the housing 3. A sliver guide 19, in the form of a condenser, is arranged upstream of the feed table 17, by means of which condenser the sliver is fed to the feed roller 16.

As already described above, if the sliver consists completely or partly of cotton, it can contain honeydew impurities. The honeydew is extremely sticky and is deposited everywhere where the fiber material slides on the walls of the housing 3. These are the areas of the feed roller 16 and the feed table 17, above all also the trash removal area 20, as well as the peripheral walls 5. It is known in prior art that these areas are provided with an anti-adhesive coating against honeydew.

With regard to the base plate 4, however it is known that only the actual trash removal area 20 is coated against honeydew, which can be effected by means of a direct coating of the base plate 4 at this point or by means of a metal sheet insert.

It is an object of the present invention to provide the entire base plate 4 with an anti-adhesive coating in particular against honeydew, whereby here also a metal sheet insert is to be used, which covers, however, the entire base plate 4. A thin metal sheet 22 is provided for this purpose, which is shown in detail in particular in FIGS. 3 and 4. This metal sheet 22 is clamped between the base plate 4 and the peripheral walls 5 during assembly of the housing 3, as can be seen from FIG. 2.

As the metal sheet 22 is only a few tenths of a millimeter thick, a metal sheet 22 of this kind can be subsequently applied to the housing 3 without the function of the opening device 1 being impaired. The anti-adhesive coating 23 provided is located on that side of the metal sheet 22 which faces the opening roller 2. As the application of the anti-adhesive coating 23 is, as a rule, connected with heat treatment, it is practical to use a suitable material for the metal sheet 22, for example, aluminum or steel. The base plate 4 itself can consist of a less heat resistant material and may be made from a zinc casting.

When the anti-adhesive coating 23 is applied, the metal sheet 22 curves in a way already described. This is clearly seen in FIG. 4. This state can be used to advantage in that, during assembly, in an unclamped state, only the edge areas 24 and 25 of the metal sheet 22 are disposed all around the entire base plate 4. When the peripheral walls 5 are being assembled, the metal sheet 22 is then clamped and thereafter pressed flat. After assembly, the edge areas 24 and 25 are disposed in a close fit on the base plate 4.

Figure 3:
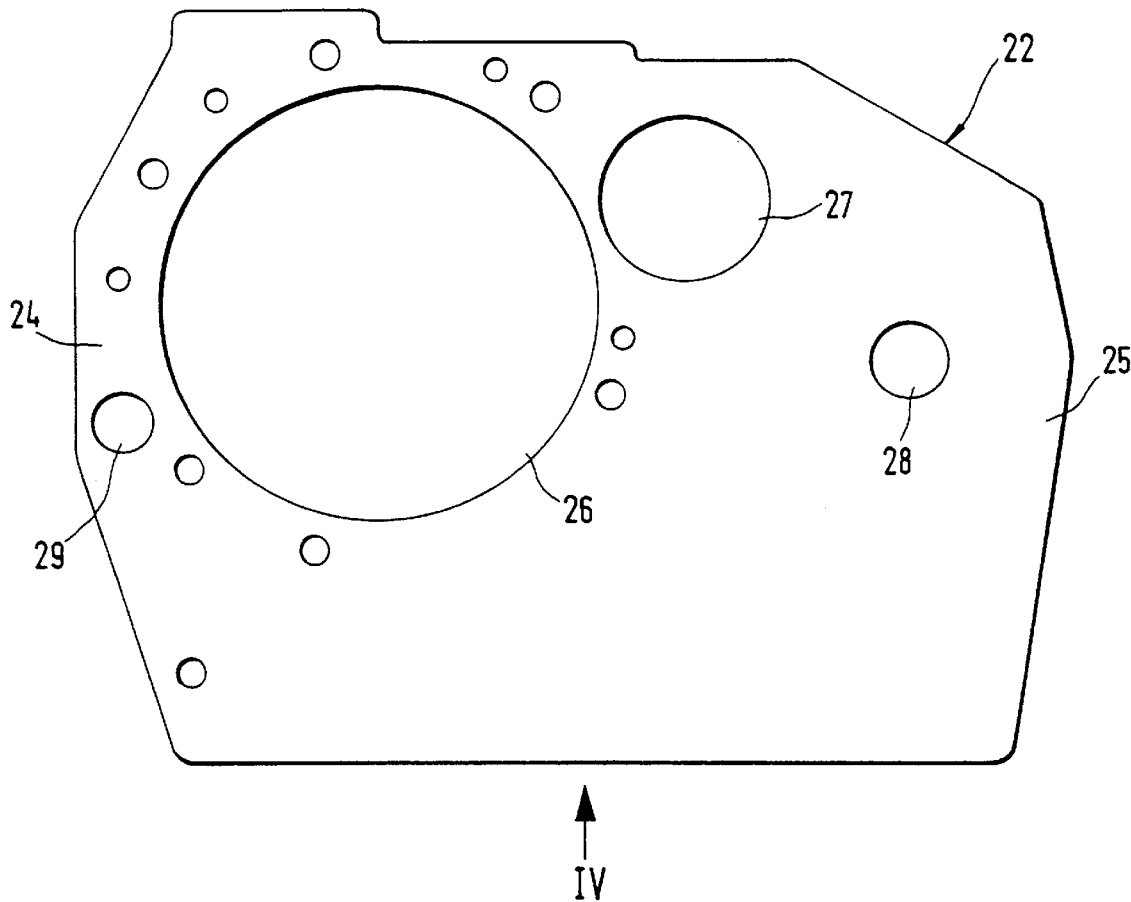
FIG. 3 is a plan view of the metal sheet shown in FIG. 2.
Figure 4:
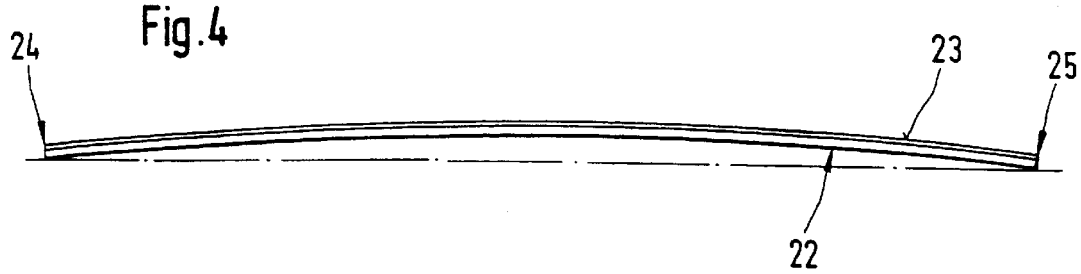
FIG. 4 is a view in the direction of the arrow IV onto the metal sheet of FIG. 3.

As can be seen from FIG. 3, the metal sheet 22 is provided with a round-shaped recess 26 for the collar 10 of the opening roller 2, and further with a round-shaped recess 27 for the feed roller 16 as well as with a recess 28 for the swivel axle 18 of the feed table 17. A further recess 29 is provided for a locking lever (not shown) for a cover (also not shown) of the opening roller 2.

The remaining recesses, not marked with reference numbers, serve the assembly of the peripheral walls 5 to the base plate 4.

In especially preferred embodiments, the metal sheet has a thickness of less than 0.7 mm, and preferably between 0.3 mm and 0.5 mm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An opening device for an open-end spinning aggregate comprising:

a housing which takes up an opening roller, said housing having a base plate perpendicularly arranged to an axis of the opening roller, and a metal sheet insert having an anti-adhesive coating provided on the base plate, wherein the metal sheet insert is a flat metal sheet which covers the base plate.

2. An opening device according to claim 1, wherein the metal sheet is clamped to the base plate by means of peripheral walls surrounding the opening roller.

3. An opening device according to claim 2, wherein the metal sheet is slightly curved in its unclamped state in such a way that it is disposed only with its edge areas on the base plate.

4. An opening device according to claim 3, wherein the metal sheet is provided with recesses for the opening roller and for a feed roller arranged upstream of the opening roller (2).

5. An opening device according to claim 4, wherein the metal sheet is more heat resistant than the base plate.

6. An opening device according to claim 5, wherein the anti-adhesive coating of the metal sheet is a ceramic coating shot through with PTFE.

7. An opening device according to claim 3, wherein the metal sheet (22) is more heat resistant than the base plate (4).

8. An opening device according to claim 3, wherein the anti-adhesive coating of the metal sheet is a ceramic coating shot through with PTFE.

9. An opening device according to claim 2, wherein the metal sheet is provided with recesses for the opening roller and for a feed roller arranged upstream of the opening roller.

10. An opening device according to claim 2, wherein the metal sheet is more heat resistant than the base plate.

11. An opening device according to claim 2, wherein the anti-adhesive coating of the metal sheet is a ceramic coating shot through with PTFE.

12. An opening device according to claim 1, wherein the metal sheet is slightly curved in its unclamped state in such a way that it is disposed only with its edge areas on the base plate.

13. An opening device according to claim 12, wherein the metal sheet is provided with recesses for the opening roller and for a feed roller arranged upstream of the opening roller.

14. An opening device according to claim 12, wherein the metal sheet (22) is more heat resistant than the base plate (4).

15. An opening device according to claim 12, wherein the anti-adhesive coating of the metal sheet is a ceramic coating shot through with PTFE.

16. An opening device according to claim 1, wherein the metal sheet is provided with recesses for the opening roller and for a feed roller arranged upstream of the opening roller.

17. An opening device according to claim 16, wherein the metal sheet (22) is more heat resistant than the base plate (4).

18. An opening device according to claim 16, wherein the anti-adhesive coating of the metal sheet is a ceramic coating shot through with PTFE.

19. An opening device according to claim 1, wherein the metal sheet is more heat resistant than the base plate.

20. An opening device according to claim 1, wherein the anti-adhesive coating of the metal sheet is a ceramic coating shot through with PTFE.

21. A method of making a metal sheet insert for a base plate of a housing for an opening roller of an opening device for an opening end spinning aggregate, said base plate extending in use perpendicularly to an axis of the opening roller, said method comprising:

providing a metal sheet insert in the form of a substantially flat metal sheet which covers the entire surface area of the base plate, said metal sheet being covered by an anti-adhesive coating in the form of a ceramic coating shot through with PTFE.

22. A metal sheet insert for a base plate of a housing for an opening roller of an opening device for an opening end spinning aggregate, said base plate extending in use perpendicularly to an axis of the opening roller, wherein the metal sheet insert is in the form of a substantially flat metal sheet which covers the entire surface area of the base plate, said metal sheet being covered by an anti-adhesive coating in the form of a ceramic coating shot through with PTFE.

\* \* \* \* \*